United States Patent
Mizuno et al.

(10) Patent No.: US 10,361,443 B2
(45) Date of Patent: Jul. 23, 2019

(54) FUEL CELL SYSTEM, AND CONTROL METHOD FOR FUEL CELL SYSTEM

(71) Applicants: Nobukazu Mizuno, Miyoshi (JP); Yoshiaki Naganuma, Toyota (JP)

(72) Inventors: Nobukazu Mizuno, Miyoshi (JP); Yoshiaki Naganuma, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 734 days.

(21) Appl. No.: 14/364,480

(22) PCT Filed: Dec. 6, 2012

(86) PCT No.: PCT/IB2012/002607
§ 371 (c)(1),
(2) Date: Jun. 11, 2014

(87) PCT Pub. No.: WO2013/088219
PCT Pub. Date: Jun. 20, 2013

(65) Prior Publication Data
US 2014/0335435 A1  Nov. 13, 2014

(30) Foreign Application Priority Data

Dec. 13, 2011 (JP) ................... 2011-272141

(51) Int. Cl.
*H01M 8/04* (2016.01)
*H01M 8/04089* (2016.01)
*H01M 8/04746* (2016.01)

(52) U.S. Cl.
CPC ... *H01M 8/04104* (2013.01); *H01M 8/04097* (2013.01); *H01M 8/04753* (2013.01);
(Continued)

(58) Field of Classification Search
CPC ......... H01M 2250/20; H01M 8/04097; H01M 8/04104; H01M 8/04753; H01M 8/04761; H01M 8/04776
See application file for complete search history.

(56) References Cited

U.S. PATENT DOCUMENTS

2005/0053814 A1* 3/2005 Imamura ............. B60L 11/1881
429/413
2006/0073363 A1* 4/2006 Taniguchi ......... H01M 8/04082
429/429
(Continued)

FOREIGN PATENT DOCUMENTS

JP 2007-184202 A 7/2007
JP 2009-043564 A 2/2009

*Primary Examiner* — Barbara L Gilliam
*Assistant Examiner* — Adam A Arciero
(74) *Attorney, Agent, or Firm* — Hunton Andrews Kurth LLP

(57) ABSTRACT

A fuel cell system includes: a fuel cell supplied with fuel gas for power generation; a fuel supply flow passage flowing fuel gas, supplied from a fuel supply source, to the fuel cell; a pressure regulating valve regulating a pressure of fuel gas flowing through the fuel supply flow passage; a fuel circulation flow passage returning gas, emitted from the fuel cell, to the fuel supply flow passage; a circulation pump delivering gas in the fuel circulation flow passage to the fuel supply flow passage; an emission valve emitting gas in the fuel circulation flow passage to an outside; and a control device controlling the pressure regulating valve, the circulation pump and the emission valve such that the sum of losses of crossover hydrogen, circulation pump power and purge hydrogen is minimum while a hydrogen stoichiometric ratio required for power generation of the fuel cell is ensured.

7 Claims, 7 Drawing Sheets

(52) U.S. Cl.
CPC ... *H01M 8/04761* (2013.01); *H01M 8/04776* (2013.01); *H01M 2250/20* (2013.01); *Y02T 90/32* (2013.01)

(56) References Cited

U.S. PATENT DOCUMENTS

| | | | |
|---|---|---|---|
| 2007/0128478 A1* | 6/2007 | Ballantine | H01M 8/04097 429/410 |
| 2008/0038593 A1* | 2/2008 | Yoshida | H01M 8/04097 429/444 |
| 2008/0187790 A1* | 8/2008 | Kamihara | H01M 8/04231 429/429 |
| 2010/0159340 A1 | 6/2010 | Oomori | |
| 2010/0190080 A1* | 7/2010 | Hasuka | H01M 8/04097 429/446 |

* cited by examiner

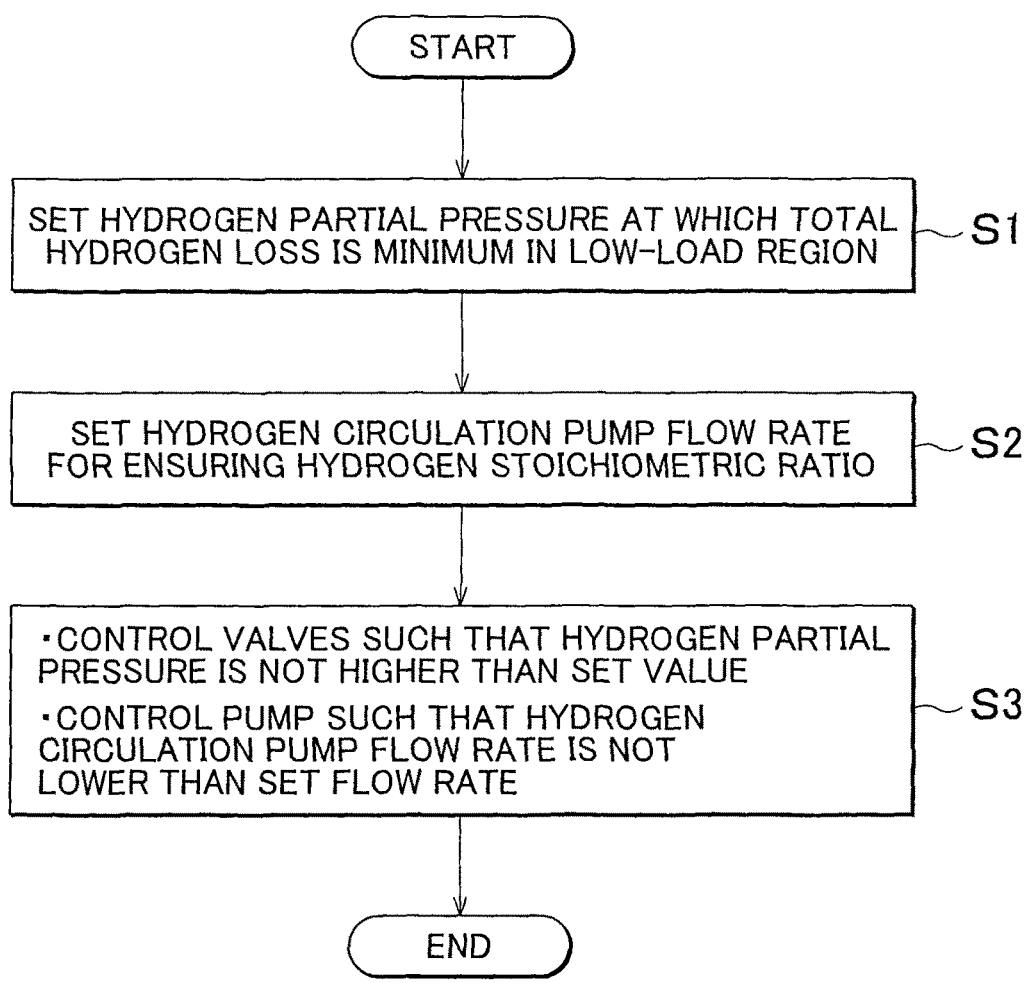

_US 10,361,443 B2_

FUEL CELL SYSTEM, AND CONTROL METHOD FOR FUEL CELL SYSTEM

CROSS-REFERENCE TO RELATED APPLICATIONS

This is a national phase application based on the PCT International Patent Application No. PCT/IB2012/002607 filed on Dec. 6, 2012, claiming priority to Japanese application No. 2011-272141 filed Dec. 13, 2011, the entire contents of both of which are incorporated herein by reference.

BACKGROUND OF THE INVENTION

1. Field of the Invention

The invention relates to a fuel cell system and a control method for a fuel cell system.

2. Description of Related Art

There has been practically used a fuel cell system that includes a fuel cell that is supplied with reaction gases (fuel gas and oxidation gas) to generate electric power. In the fuel cell system, for the purpose of ensuring stable power generation in the fuel cell, reaction gases slightly larger than respective gas amounts corresponding to a power (load request) required from a load device are generally supplied to the fuel cell. Here, the ratios of supplied gas amounts (actually, gas amounts supplied to the fuel cell) to respective reference gas amounts (gas amounts corresponding to the load request) may be referred to as "stoichiometric ratios".

Currently, there is suggested a fuel cell system that includes means for calculating the stoichiometric ratios (cell stoichiometric ratios) of reaction gases for each of single cells that constitute a fuel cell and means for increasing the amount of supplied reaction gas when the corresponding cell stoichiometric ratio is lower than a predetermined value (for example, see Japanese Patent Application Publication No. 2007-184202 (JP 2007-184202 A)).

However, in the existing fuel cell system described in JP 2007-184202 A, it is possible to ensure desired stoichiometric ratios; however, it is not designed to suppress a power loss, so fuel, such as hydrogen gas, may be consumed unnecessarily. Particularly, currently, for the purpose of avoiding transitional fuel shortage (due to a delay in response of a circulation pump, or the like) during acceleration, a technique for keeping a high hydrogen concentration in a low load region is employed, so there is a problem that a fuel loss increases in the low load region.

In addition, in recent years, for the purpose of preventing drying of a fuel cell, there has been an attempt to increase the amount of water transferred from a cathode to an anode by reducing the thickness of an electrolyte membrane that constitutes the fuel cell. However, when the thickness of the electrolyte membrane is reduced in this way, there is a concern about a new problem that the amount of hydrogen gas that permeates from the anode to the cathode increases by that much and, as a result, hydrogen gas supplied for power generation is burned and consumed in the cathode without reacting with air. Thus, in order to employ such a thin electrolyte membrane, further technical innovation has been expected in order to suppress a fuel loss.

SUMMARY OF THE INVENTION

The invention provides a fuel cell system and a control method for the fuel cell system, which are able to minimize a fuel loss while ensuring a stoichiometric ratio.

A first aspect of the invention provides a fuel cell system. The fuel cell system includes: a fuel cell that is supplied with fuel gas to generate electric power; a fuel supply flow passage that flows fuel gas, supplied from a fuel supply source, to the fuel cell; a pressure regulating valve that regulates a pressure of fuel gas that flows through the fuel supply flow passage; a fuel circulation flow passage that returns gas, emitted from the fuel cell, to the fuel supply flow passage; a circulation pump that delivers the gas in the fuel circulation flow passage to the fuel supply flow passage; an emission valve that emits the gas in the fuel circulation flow passage; and a control device that controls the pressure regulating valve, the circulation pump and the emission valve such that the sum of an amount of hydrogen that permeates from an anode of the fuel cell to a cathode of the fuel cell, an amount of hydrogen used to generate electric power corresponding to a power loss of the circulation pump and an amount of hydrogen emitted through the emission valve is minimum while a hydrogen stoichiometric ratio required for the fuel cell to generate electric power is ensured.

In addition, a second aspect of the invention provides a control method for a fuel cell system that includes: a fuel cell that is supplied with fuel gas to generate electric power; a fuel supply flow passage that flows fuel gas, supplied from a fuel supply source, to the fuel cell; a pressure regulating valve that regulates a pressure of fuel gas that flows through the fuel supply flow passage; a fuel circulation flow passage that returns gas, emitted from the fuel cell, to the fuel supply flow passage; a circulation pump that delivers the gas in the fuel circulation flow passage to the fuel supply flow passage; and an emission valve that emits the gas in the fuel circulation flow passage. The control method includes: controlling the pressure regulating valve, the circulation pump and the emission valve such that the sum of an amount of hydrogen that permeates from an anode of the fuel cell to a cathode of the fuel cell, an amount of hydrogen used to generate electric power corresponding to a power loss of the circulation pump and an amount of hydrogen emitted through the emission valve is minimum while a hydrogen stoichiometric ratio required for the fuel cell to generate electric power is ensured.

With the above configuration and method, it is possible to minimize a fuel loss while ensuring a hydrogen stoichiometric ratio required for the fuel cell to generate electric power. Here, the hydrogen stoichiometric ratio means a value obtained by dividing the amount of supplied hydrogen (the amount of hydrogen actually supplied to the fuel cell) by a reference amount of hydrogen (the amount of hydrogen corresponding to a power required from a load device).

In the fuel cell system (control method) according to the above-described aspects of the invention, the control device (control step) may control the pressure regulating valve and the emission valve such that an actual hydrogen partial pressure is not higher than an optimal hydrogen partial pressure at which the sum is minimum in a load region in which a power required from a load device is smaller than or equal to a predetermined threshold.

With the above-described configuration (method), in a low-load region (the load region in which the output required from the load device is smaller than or equal to the predetermined threshold), it is possible to control the pressure regulating valve and the emission valve such that the hydrogen partial pressure (the ratio of the hydrogen gas pressure to the total gas pressure in the fuel cell) is not higher than the optimal hydrogen partial pressure. Thus, it is possible to reduce the crossover hydrogen loss (the amount of hydrogen that permeates from the anode of the fuel cell to the cathode of the fuel cell) that is the largest loss at the time of increasing the hydrogen stoichiometric ratio, so it is possible to efficiently suppress the fuel loss.

In addition, in the fuel cell system (control method) according to the above-described aspects of the invention, the control device (control step) may control the circulation pump such that a flow rate of gas delivered to the fuel supply flow passage is not lower than a predetermined set flow rate.

With the above-described configuration (method), in the low-load region, it is possible to control the circulation pump such that the hydrogen circulation pump flow rate (the flow rate of gas delivered from the circulation flow passage to the fuel supply flow passage) is not lower than the predetermined set flow rate. That is, at the time of ensuring the hydrogen stoichiometric ratio, the operation amount of the circulation pump that has the smallest loss is increased, so it is possible to efficiently suppress the fuel loss by reducing the crossover hydrogen loss having a large loss by that much.

According to the aspects of the invention, it is possible to provide the fuel cell system and the control method for the fuel cell system, which are able to minimize the fuel loss while ensuring the stoichiometric ratio.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9 is a flowchart for illustrating a control method for the fuel cell system shown in FIG. 1.

DETAILED DESCRIPTION OF EMBODIMENTS

Hereinafter, a fuel cell system 1 according to an embodiment of the invention will be described with reference to the accompanying drawings. In the present embodiment, description will be made on an example in which the invention is applied to an in-vehicle power generation system for a fuel cell vehicle.

First, the configuration of the fuel cell system 1 according to the embodiment of the invention will be described with reference to FIG. 1.

Figure 1:
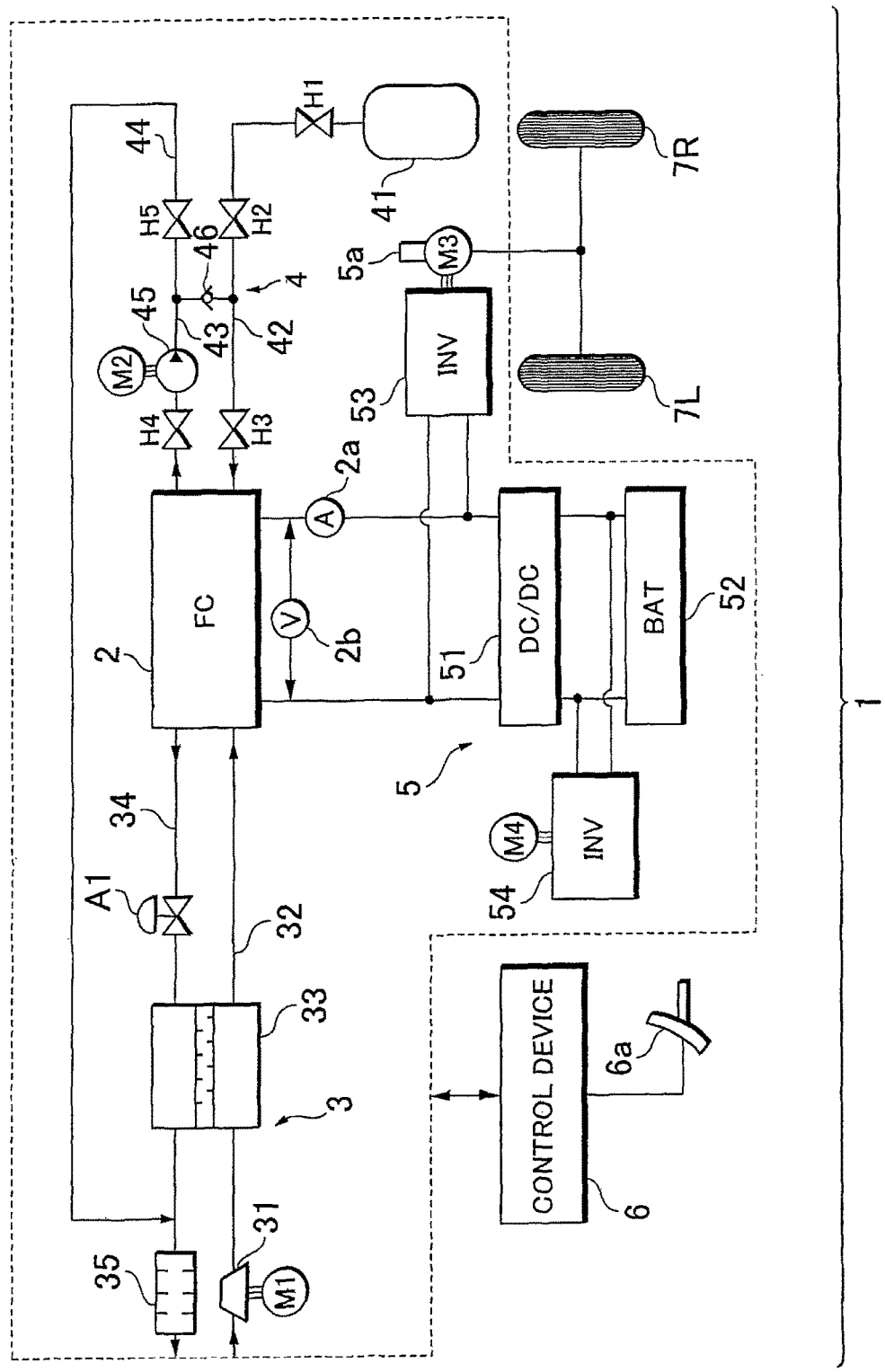
FIG. 1 is a configuration view of a fuel cell system according to an embodiment of the invention.

As shown in FIG. 1, the fuel cell system 1 according to the present embodiment is to drive a traction motor M3 for rotation by supplying electric power generated by a fuel cell 2 or a battery 52 to the traction motor M3 via a traction inverter 53. The fuel cell system 1 includes the fuel cell 2, an oxidation gas pipeline 3, a fuel gas pipeline 4, an electric power system 5, a control device 6, and the like. The fuel cell 2 is supplied with reaction gases (oxidation gas and fuel gas) to generate electric power. The oxidation gas pipeline 3 supplies air that serves as the oxidation gas to the fuel cell 2. The fuel gas pipeline 4 supplies hydrogen gas that serves as the fuel gas to the fuel cell 2. The electric power system 5 charges or discharges electric power of the system. The control device 6 comprehensively controls the overall system.

The fuel cell 2 is, for example, formed of a solid polymer electrolyte type, and has a stack structure in which a large number of single cells are stacked. Each of the single cells that constitute the fuel cell 2 has a structure such that a membrane electrode assembly (MEA) formed by sandwiching a polymer electrolyte membrane between two electrodes, that is, an anode electrode and a cathode electrode, is further sandwiched by separators for supplying fuel gas and oxidation gas. The pair of separators are provided so as to sandwich the cathode electrode and the anode electrode from both sides. Fuel gas is supplied to a fuel gas flow passage of one of the separators, oxidation gas is supplied to an oxidation gas flow passage of the other one of the separators, and the fuel cell 2 generates electric power using the supplied gases. That is, in the fuel cell 2, oxidation reaction expressed by the following equation (1) occurs in each of the anode electrodes, reduction reaction expressed by the following equation (2) occurs in each of the cathode electrodes, and electrogenic reaction expressed by the following equation (3) occurs in the fuel cell 2 as a whole.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

A current sensor 2a and a voltage sensor 2b are provided at the fuel cell 2. The current sensor 2a detects a current (output current) during power generation. The voltage sensor 2b detects a voltage (output voltage) during power generation. Note that the fuel cell 2 may be not only a solid polymer electrolyte type but also various types, such as a phosphoric-acid type and a molten carbonate type.

The oxidation gas pipeline 3 includes an air compressor 31, an oxidation gas supply passage 32, a humidifying module 33, a cathode offgas flow passage 34, a diluter 35, a motor M1 that drives the air compressor 31, and the like.

The air compressor 31 is driven by the driving force of the motor M1 that is activated in response to a control command from the control device 6 to supply air (oxidation gas), taken in from outside air via an air filter (not shown), to a cathode of the fuel cell 2. The oxidation gas supply passage 32 is a gas flow passage used to guide air supplied from the air compressor 31 to the cathode of the fuel cell 2. Cathode offgas is emitted from the cathode of the fuel cell 2. The cathode offgas is in a high humid state because it contains moisture produced through cell reaction in the fuel cell 2.

The humidifying module 33 carries out moisture exchange between the oxidation gas in a low humid state, flowing through the oxidation gas supply passage 32, and cathode offgas in a high humid state, flowing through the cathode offgas flow passage 34, and adequately humidifies oxidation gas supplied to the fuel cell 2. The cathode offgas flow passage 34 is a gas flow passage used to exhaust cathode offgas to the outside of the system, and an air pressure regulating valve A1 is arranged near a cathode outlet of the gas flow passage 34. A back pressure of oxidation gas supplied to the fuel cell 2 is regulated by the air pressure regulating valve A1. The diluter 35 dilutes the emission concentration of hydrogen gas such that the emission concentration falls within a preset concentration range (range set on the basis of environmental standards, or the like). The downstream side of the cathode offgas flow passage 34 and the downstream side of an anode offgas flow passage 44 (described later) are in fluid communication with the diluter 35, so hydrogen offgas and oxygen offgas are mixed and diluted and then exhausted to the outside of the system.

The fuel gas pipeline 4 includes a fuel supply source 41, a fuel supply flow passage 42, a fuel circulation flow passage 43, an anode offgas flow passage 44, a hydrogen circulation pump 45, a check valve 46, a motor M2 for driving the hydrogen circulation pump 45, and the like.

The fuel supply source 41 is a device that supplies fuel gas, such as hydrogen gas, to the fuel cell 2, and, is, for example, formed of a high-pressure hydrogen tank, a hydrogen storage tank, or the like. The fuel supply flow passage 42 is a gas flow passage used to guide fuel gas, delivered from the fuel gas supply source 41, to an anode of the fuel cell 2. Valves, such as a tank valve H1, a hydrogen supply valve H2 and an FC inlet valve H3, are arranged in the fuel supply flow passage 42 in order from the upstream side to the downstream side. The tank valve H1, the hydrogen supply valve H2 and the FC inlet valve H3 are shut valves used to supply (or shut off) fuel gas to the fuel cell 2, and each are, for example, formed of an electromagnetic valve. The hydrogen supply valve H2 is to regulate the pressure of fuel gas flowing through the fuel supply flow passage 42, and functions as a pressure regulating valve according to the aspect of the invention.

The fuel circulation flow passage 43 is a return gas flow passage used to return unreacted fuel gas, emitted from the fuel cell 2, to the fuel supply flow passage 42. An FC outlet valve H4, the hydrogen circulation pump 45 and the check valve 46 are arranged in the fuel circulation flow passage 43 in order from the upstream side to the downstream side. Low-pressure unreacted fuel gas emitted from the fuel cell 2 is adequately pressurized by the hydrogen circulation pump 45 driven by the driving force of the motor M2 that is activated in response to a control command from the control device 6, and is delivered to the fuel supply flow passage 42. Back flow of fuel gas from the fuel supply flow passage 42 to the fuel circulation flow passage 43 is suppressed by the check valve 46. The anode offgas flow passage 44 is a gas flow passage used to exhaust anode offgas that contains hydrogen offgas emitted from the fuel cell 2 to the outside of the system. A purge valve H5 is arranged in the anode offgas flow passage 44. The purge valve H5 is to emit gas inside the fuel circulation flow passage 43 to the outside, and functions as an emission valve according to the aspect of the invention.

The electric power system 5 includes a high-pressure DC/DC converter 51, the battery 52, the traction inverter 53, an auxiliary inverter 54, the traction motor M3, an auxiliary motor M4, and the like.

The high-pressure DC/DC converter 51 is a direct-current voltage converter. The high-pressure DC/DC converter 51 has the function of regulating direct-current voltage input from the battery 52 and then outputting the direct-current voltage to the traction inverter 53 side and the function of regulating direct-current voltage input from the fuel cell 2 or the traction motor M3 and then outputting the direct-current voltage to the battery 52'. The battery 52 is charged and discharged by these functions of the high-pressure DC/DC converter 51. In addition, the output voltage of the fuel cell 2 is controlled by the high-pressure DC/DC converter 51.

The battery 52 is connected to the traction motor M3 in parallel with the fuel cell 2. The battery 52 has the function of storing redundant electric power and regenerative energy during regenerative braking, and also functions as an energy buffer at the time of load fluctuations due to acceleration or deceleration of the fuel cell vehicle. The battery 52 is a chargeable and dischargeable secondary battery, and is formed of various secondary batteries (such as a nickel-cadmium battery, a nickel-metal-hydride battery and a lithium secondary battery). The battery 52 is able to be charged with redundant electric power or supply additional electric power through control executed by a battery computer (not shown). Part of direct-current electric power generated by the fuel cell 2 is stepped up or stepped down by the high-pressure DC/DC converter 51, and the battery 52 is charged. Note that, instead of the battery 52, a chargeable and dischargeable capacitor, other than a secondary battery, may be employed.

The traction inverter 53 and the auxiliary inverter 54 are pulse width modulation-type PWM inverters. The traction inverter 53 and the auxiliary inverter 54 each convert direct-current electric power output from the fuel cell 2 or the battery 52 to three-phase alternating-current electric powers in accordance with a given control command and then supply the three-phase alternating-current electric powers to a corresponding one of the traction motor M3 and the auxiliary motor M4. The traction motor M3 is a motor used to drive wheels 7R and 7L. A rotation speed detecting sensor 5a is provided at the traction motor M3, and detects the rotation speed of the traction motor M3. The auxiliary motor M4 is a motor used to drive various auxiliaries, and is a collective term of the motor M1 that drives the air compressor 31, the motor M2 that drives the hydrogen circulation pump 45, and the like. Note that, in the present embodiment, all the devices that are activated by receiving electric power supplied from the fuel cell 2 are collectively termed as a load device.

The control device 6 is a computer system used to control various portions of the fuel cell system 1 in an integrated manner, and includes a CPU and various memories (a ROM, a RAM, or the like). The control device 6 calculates a load (required power) of the load device by receiving signals (for example, various sensor signals transmitted from the rotation speed detecting sensor 5a, an accelerator pedal sensor 6a that detects an accelerator pedal operation amount, and the like) supplied from various sensors. Then, the control device 6 controls the output voltage and output current of the fuel cell 2 such that an output electric power corresponding to the load is generated. In addition, the control device 6 controls the output pulse widths of the traction inverter 53 and auxiliary inverter 54, and the like, to control the traction motor M3 and the auxiliary motor M4.

The load of the load device is, for example, a total value of a vehicle travelling electric power and an auxiliary electric power. The auxiliary electric power includes electric power consumed by various auxiliaries (such as the air compressor 31 and the hydrogen circulation pump 45), electric power consumed by devices required for travel of the vehicle (such as a transmission, a wheel control device, a steering system and a suspension system), electric power consumed by devices arranged inside a passenger space (such as an air conditioner, a lighting apparatus and an audio), and the like.

In addition, the control device 6 executes "fuel loss avoiding control" for controlling various valves and the pump such that a fuel loss is minimized while a hydrogen stoichiometric ratio required for power generation of the fuel cell 2 is ensured. Specifically, the control device 6 controls the hydrogen supply valve H2, the hydrogen circulation pump 45 and the purge valve H5 such that the sum of a crossover hydrogen loss, a hydrogen circulation pump power loss and a purge hydrogen loss is minimized while the hydrogen stoichiometric ratio larger than or equal to a predetermined value is ensured. Note that the hydrogen stoichiometric ratio means a value obtained by dividing the amount of supplied hydrogen (the amount of hydrogen actually supplied to the fuel cell 2) by a reference amount of hydrogen (the amount of hydrogen corresponding to a power required from the load device).

Here, the "fuel loss avoiding control" executed by the control device 6 according to the present embodiment will be described in more details with reference to FIG. 2 to FIG. 8.

Figure 2:
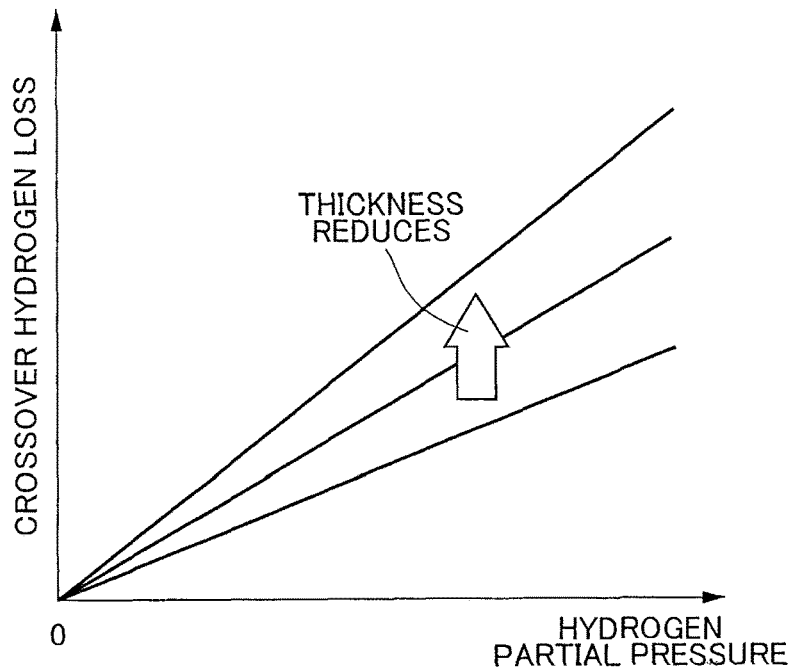
FIG. 2 is a graph that shows the correlation between a hydrogen partial pressure and a crossover hydrogen loss.

FIG. 2 is a graph that shows the correlation between a hydrogen partial pressure (the percentage of hydrogen gas pressure with respect to total gas pressure in the fuel cell 2) and a crossover hydrogen loss (the amount of hydrogen that permeates from the anode of the fuel cell 2 to the cathode of the fuel cell 2). As shown in FIG. 2, it is known that the crossover hydrogen loss increases with an increase in hydrogen partial pressure and the crossover hydrogen loss increases with a reduction in the thickness of the electrolyte membrane that constitutes the fuel cell 2. The hydrogen partial pressure is regulated through open/close control over the hydrogen supply valve H2 and the purge valve H5.

Figure 3:
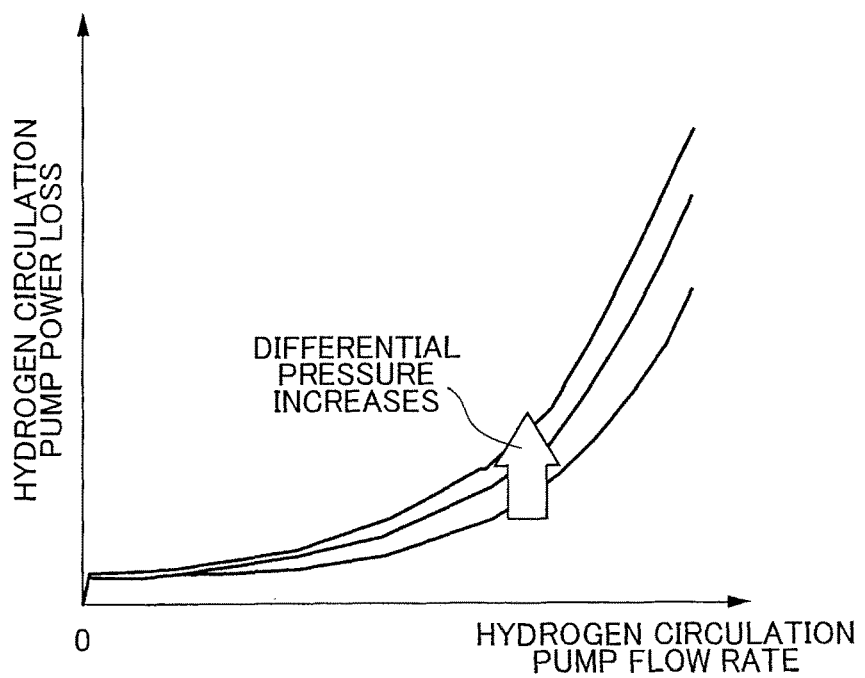
FIG. 3 is a graph that shows the correlation between a hydrogen circulation pump flow rate and a hydrogen circulation pump power loss.

FIG. 3 is a graph that shows the correlation between a hydrogen circulation pump flow rate (the flow rate of gas delivered to the fuel supply flow passage 42 by the hydrogen circulation pump 45) and a hydrogen circulation pump power loss (the amount of hydrogen for generating electric power corresponding to the power loss of the hydrogen circulation pump 45). As shown in FIG. 3, it is known that the hydrogen circulation pump power loss increases with an increase in hydrogen circulation pump flow rate and increases with an increase in differential pressure (difference between the discharge pressure and suction pressure of the hydrogen circulation pump 45). The hydrogen circulation pump flow rate is regulated through rotation speed control over the motor M2 that drives the hydrogen circulation pump 45.

Figure 4:
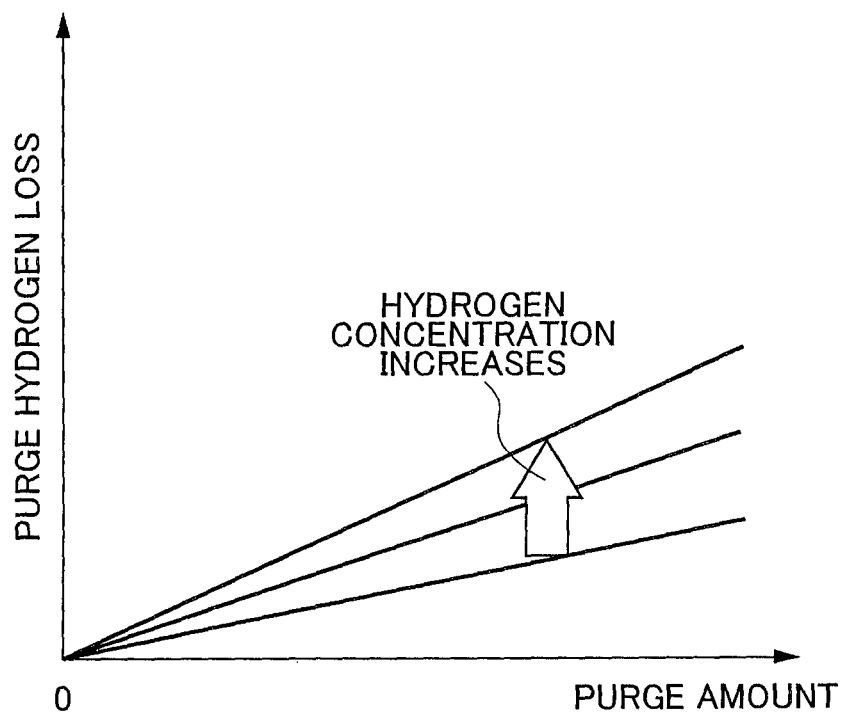
FIG. 4 is a graph that shows the correlation between a purge amount and a purge hydrogen loss.

FIG. 4 is a graph that shows the correlation between a purge amount (the amount of gas emitted through the purge valve H5) and a purge hydrogen loss (the amount of hydrogen emitted through the purge valve H5). As shown in FIG. 4, it is known that the purge hydrogen loss increases with an increase in purge amount and increases with an increase in hydrogen concentration in gas emitted through the purge valve H5.

When these three types of losses are compared with one another, it has been confirmed through an experiment, or the like, that, in the case where the hydrogen stoichiometric ratio is increased by a predetermined value (for example, 0.1), the "crossover hydrogen loss" is maximum and the "hydrogen circulation pump power loss" is minimum. Therefore, the control device 6 controls the hydrogen supply valve H2 and the purge valve H5 such that the "crossover hydrogen loss" is suppressed by decreasing the hydrogen partial pressure with respect to that during normal times, and controls the hydrogen circulation pump 45 such that the hydrogen stoichiometric ratio is ensured by increasing the hydrogen circulation pump flow rate with respect to that during normal times. Note that, when the purge valve H5 is controlled such that the hydrogen partial pressure is decreased with respect to that during normal times in order to suppress the "crossover hydrogen loss", the purge amount reduces as compared with that during normal times, so the "purge hydrogen loss" is also suppressed at the same time.

Figure 5:
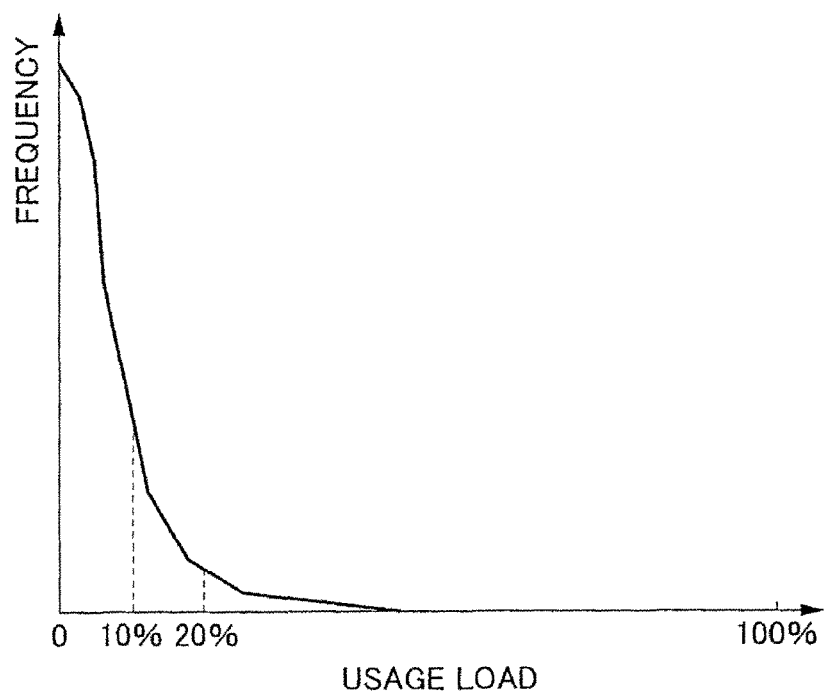
FIG. 5 is a graph that shows the correlation between a usage load and usage frequency of a fuel cell vehicle.

Incidentally, during a mode travel (for example, 10-15 mode travel) of the fuel cell vehicle, as shown in FIG. 5, it has been confirmed through an experiment, or the like, that the frequency of usage in a "low-load region" in which a power required from the load device is smaller than or equal to 20% or less of a maximum load is extremely high.

Figure 6:
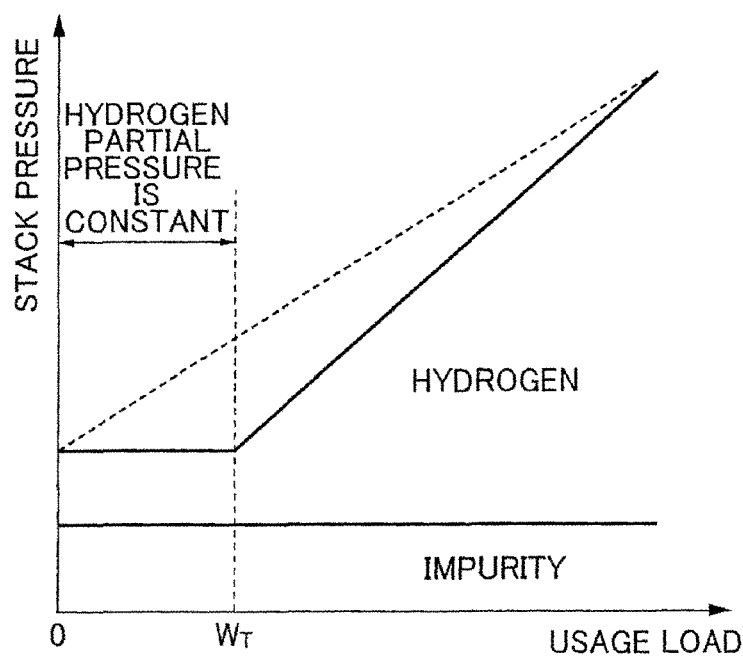
FIG. 6 is a graph that shows the correlation between a usage load and a stack pressure in the fuel cell system shown in FIG. 1.
Figure 7:
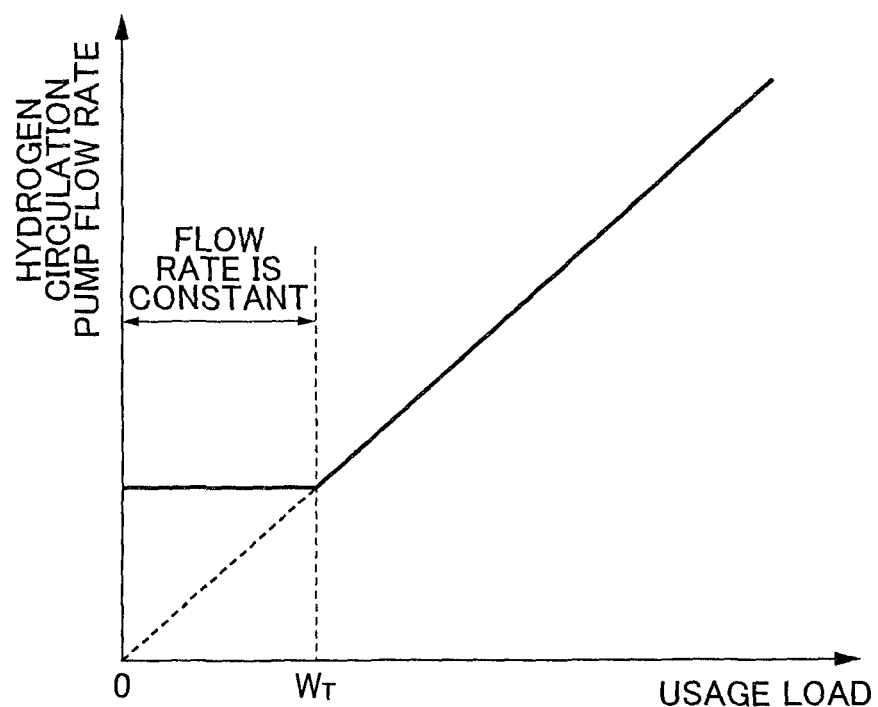
FIG. 7 is a graph that shows the correlation between a usage load and a hydrogen circulation pump flow rate in the fuel cell system shown in FIG. 1.

Then, as shown in FIG. 6, the control device 6 in the present embodiment controls the hydrogen supply valve H2 and the purge valve H5 such that the hydrogen partial pressure is not larger than a predetermined set value in the "low-load region" in which the power required from the load device is smaller than or equal to a predetermined threshold $W_T$ (for example, a value that is 20% of the maximum load) (through such control over the purge valve H5, the purge hydrogen loss is suppressed at the same time). In addition, as shown in FIG. 7, the control device 6 controls the hydrogen circulation pump 45 via the motor M2 such that the hydrogen circulation pump flow rate is not lower than a predetermined set flow rate in the "low-load region" in which the power required from the load device is smaller than or equal to the predetermined threshold $W_T$. By so doing, it is possible to ensure the hydrogen stoichiometric ratio larger than or equal to the predetermined value while the crossover hydrogen loss in the low-load region is suppressed.

Note that, when the "fuel loss avoiding control" in the present embodiment is not executed, as indicated by the broken line in FIG. 6, the hydrogen partial pressure gradually increases in the low-load region and, accordingly, the crossover hydrogen loss gradually increases, so it is assumed that the fuel loss increases as a whole. In addition, when the "fuel loss avoiding control" in the present embodiment is not executed, as indicated by the broken line in FIG. 7, the hydrogen circulation pump flow rate in the low-load region is insufficient, so it may be not possible to ensure the hydrogen stoichiometric ratio larger than or equal to the predetermined value.

Figure 8:
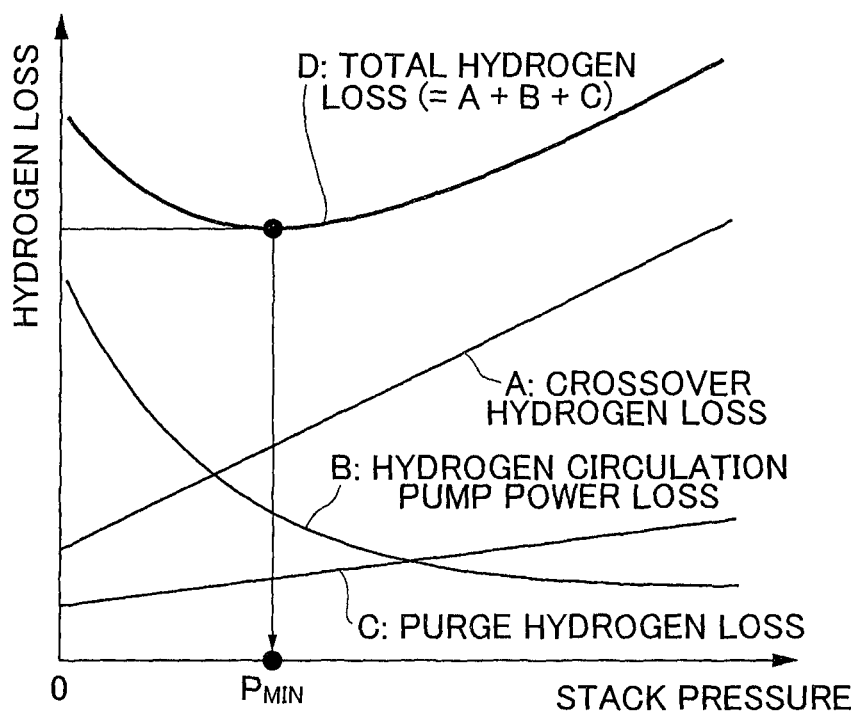
FIG. 8 is a graph that shows the correlation between a stack pressure and a hydrogen loss in the fuel cell system shown in FIG. 1.

FIG. 8 is a graph that shows the correlation between a stack pressure (total gas pressure in the fuel cell 2) and a hydrogen loss amount in the case where the hydrogen stoichiometric ratio and an impurity partial pressure in the fuel cell 2 are kept at constant values in the low-load region. In FIG. 8, a straight line "A" indicates the correlation between a stack pressure and a crossover hydrogen loss, a curve "B" indicates the correlation between a stack pressure and a hydrogen circulation pump power loss, a straight line "C" indicates the correlation between a stack pressure and a purge hydrogen loss, and a curve "D" indicates the correlation between a stack pressure and a total hydrogen loss.

As indicated by the straight lines "A" and "C" in FIG. 8, the crossover hydrogen loss and the purge hydrogen loss increase with an increase in stack pressure, while, as indicated by the curve "B" in FIG. 8, the hydrogen circulation pump power loss reduces with an increase in stack pressure. Then, as indicated by a curve "D" in FIG. 8, it appears that the total hydrogen loss is minimum at a certain stack pressure ($P_{MIN}$). It is possible to set the hydrogen partial pressure (optimal hydrogen partial pressure) employed in the low-load region as shown in FIG. 6 on the basis of the stack pressure $P_{MIN}$ determined by referring to the graph in this way and the preset impurity partial pressure. After the optimal hydrogen partial pressure is set, in order to ensure the hydrogen stoichiometric ratio larger than or equal to the predetermined value, it is possible to set the hydrogen circulation pump flow rate employed in the low-load region as shown in FIG. 7.

Next, a control method for the fuel cell system 1 according to the present embodiment will be described.

First, the stack pressure $P_{MIN}$ at which the total hydrogen loss is minimum is determined by referring to the graph shown in FIG. 8, and then the hydrogen partial pressure (optimal hydrogen partial pressure) at which the total hydrogen loss is minimum in the low-load region is set on the basis of the stack pressure $P_{MIN}$ and the preset impurity partial pressure (hydrogen partial pressure setting step: S1). Subsequently, the hydrogen circulation pump flow rate for ensuring the stoichiometric ratio in the low-load region is set on the basis of the optimal hydrogen partial pressure set in hydrogen partial pressure setting step S1 and a lower limit of the hydrogen stoichiometric ratio (hydrogen circulation pump flow rate setting step: S2).

Subsequently, the control device 6 controls the hydrogen supply valve H2 and the purge valve H5 such that an actual hydrogen partial pressure is not higher than the optimal hydrogen partial pressure set in the hydrogen partial pressure setting step S1 in the low-load region, and controls the hydrogen circulation pump 45 via the motor M2 such that an actual hydrogen circulation pump flow rate is not lower than the flow rate set in the hydrogen circulation pump flow rate setting step S2 (control step: S3).

In the above-described fuel cell system 1 according to the embodiment, it is possible to minimize the fuel loss while ensuring the hydrogen stoichiometric ratio required for power generation of the fuel cell 2.

In addition, in the above-described fuel cell system 1 according to the embodiment, it is possible to control the hydrogen supply valve H2 and the purge valve H5 such that the hydrogen partial pressure is not higher than the optimal hydrogen partial pressure in the low-load region. Thus, it is possible to reduce the crossover hydrogen loss (the amount of hydrogen that permeates from the anode of the fuel cell 2 to the cathode of the fuel cell 2) that is the largest loss at the time of increasing the hydrogen stoichiometric ratio, so it is possible to efficiently suppress the fuel loss.

In addition, in the above-described fuel cell system 1 according to the embodiment, it is possible to control the hydrogen circulation pump 45 such that the hydrogen circulation pump flow rate is not lower than the predetermined set flow rate in the low-load region. That is, at the time of ensuring the hydrogen stoichiometric ratio, the operation amount of the hydrogen circulation pump 45 that has the smallest loss is increased, so it is possible to efficiently suppress the fuel loss by reducing the crossover hydrogen loss having a large loss by that much.

Note that, in the above-described embodiment, the hydrogen supply valve H2 is employed as the pressure regulating valve; however, instead of the hydrogen supply valve H2 (or in addition to the hydrogen supply valve H2), the tank valve H1 or the FC inlet valve H3 may be employed as the pressure regulating valve.

In addition, in the above-described embodiment, the stack pressure at which the total hydrogen loss is minimum is determined by employing the graph (FIG. 8) for the low-load region, the hydrogen partial pressure and the hydrogen circulation pump flow rate are set on the basis of the determined stack pressure, and then the fuel loss avoiding control is executed; instead, it is possible to execute fuel loss avoiding control in the same manner in another load region (an intermediate load region to a high-load region).

In addition, in the above-described embodiment, the fuel cell system according to the aspect of the invention is mounted on the fuel cell vehicle; instead, the fuel cell system according to the aspect of the invention may be mounted on various mobile units (such as a robot, a ship and an airplane) other than the fuel cell vehicle. In addition, the fuel cell system according to the aspect of the invention may be applied to a stationary power generation system that is used as power generation equipment for a structure (such as a house and a building). Furthermore, it may also be applied to a portable fuel cell system.

The invention claimed is:

1. A fuel cell system comprising:
  a fuel cell that is supplied with fuel gas to generate electric power;
  a fuel supply flow passage that flows fuel gas, supplied from a fuel supply source, to the fuel cell;
  a pressure regulating valve that regulates a pressure of fuel gas that flows through the fuel supply flow passage;
  a fuel circulation flow passage that returns gas, emitted from the fuel cell, to the fuel supply flow passage;
  a circulation pump that delivers the gas in the fuel circulation flow passage to the fuel supply flow passage;
  an emission valve that emits the gas in the fuel circulation flow passage to an outside; and
  a control device programmed to control the pressure regulating valve, the circulation pump and the emission valve to minimize a sum of an amount of hydrogen loss that permeates from an anode of the fuel cell to a cathode of the fuel cell, an amount of a power loss of the circulation pump and an amount of hydrogen loss emitted through the emission valve, and to determine a stack pressure on the basis of the sum while a value obtained by dividing an amount of hydrogen actually supplied to the fuel cell by an amount of hydrogen corresponding to a power required from a load device, which is required for the fuel cell to generate the electric power is larger than or equal to a predetermined value.

2. The fuel cell system according to claim 1, wherein the control device controls the pressure regulating valve and the emission valve such that an actual hydrogen partial pressure is not higher than an optimal hydrogen partial pressure at which the sum is reduced in a low-load region in which the power required from the load device is smaller than or equal to a predetermined threshold.

3. The fuel cell system according to claim 2, wherein the control device controls the circulation pump such that a flow rate of the gas delivered to the fuel supply flow passage is not lower than a predetermined set flow rate.

4. The fuel cell system according to claim 2, wherein the predetermined threshold is 20% of a maximum load required from the load device.

5. The fuel cell system according to claim 1, wherein the hydrogen stoichiometric ratio is a value obtained by dividing an amount of hydrogen actually supplied to the fuel cell by an amount of hydrogen corresponding to the power required from the load device.

6. The fuel cell system according to claim 1, wherein the control device is further programmed to
set, after the stack pressure is determined, an optimal hydrogen partial pressure at which the sum of the losses is minimum in a low-load region in which the power required from the load device is smaller than or equal to a predetermined threshold;
set a hydrogen circulation pump flow rate to be used in the low-load region on the basis of the optimal hydrogen partial pressure after the optimal hydrogen partial pressure is set; and
controls at least one of the pressure regulating valve and the emission valve using the optimal hydrogen partial pressure, and control the circulation pump using the set hydrogen circulation pump flow rate.

7. A fuel cell system comprising:
a fuel cell that is supplied with fuel gas to generate electric power;
a fuel supply flow passage that flows fuel gas, supplied from a fuel supply source, to the fuel cell;
a pressure regulating valve that regulates a pressure of fuel gas that flows through the fuel supply flow passage;
a fuel circulation flow passage that returns gas, emitted from the fuel cell, to the fuel supply flow passage;
a circulation pump that delivers the gas in the fuel circulation flow passage to the fuel supply flow passage;
an emission valve that emits the gas in the fuel circulation flow passage to an outside; and
a control device programmed to control the pressure regulating valve, the circulation pump and the emission valve to minimize a sum of an amount of hydrogen that permeates from an anode of the fuel cell to a cathode of the fuel cell, an amount of hydrogen used to generate the electric power corresponding to a power loss of the circulation pump and an amount of hydrogen emitted through the emission valve while a value obtained by dividing an amount of hydrogen actually supplied to the fuel cell by an amount of hydrogen corresponding to a power required from a load device, which is required for the fuel cell to generate the electric power is larger than or equal to a predetermined value and in a low-load region in which the power required from the load device is smaller than or equal to a predetermined threshold,
wherein the control device is further programmed to:
set an optimal hydrogen partial pressure at which the sum is minimum in the low-load region in which the power required from the load device is smaller than or equal to the predetermined threshold;
set a hydrogen circulation pump flow rate to be used in the low-load region on the basis of the optimal hydrogen partial pressure after the optimal hydrogen partial pressure is set;
control at least one of the pressure regulating valve and the emission valve using the optimal hydrogen partial pressure, and
control the circulation pump using the set hydrogen circulation pump flow rate.

* * * * *